(12) United States Patent
Mainelis et al.

(10) Patent No.: US 9,333,512 B2
(45) Date of Patent: May 10, 2016

(54) ELECTROSTATIC SCREEN DEVICE AND METHOD FOR EMISSION CONTROL

(71) Applicants: Gediminas Mainelis, Milltown, NJ (US); Taewon Han, Albany, CA (US)

(72) Inventors: Gediminas Mainelis, Milltown, NJ (US); Taewon Han, Albany, CA (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 100 days.

(21) Appl. No.: 14/050,310

(22) Filed: Oct. 9, 2013

(65) Prior Publication Data

US 2014/0041519 A1 Feb. 13, 2014

Related U.S. Application Data (63) Continuation-in-part of application No. 12/876,570, filed on Sep. 7, 2010, now Pat. No. 8,721,767.

(60) Provisional application No. 61/240,079, filed on Sep. 4, 2009, provisional application No. 61/711,336, filed on Oct. 9, 2012.

(51) Int. Cl.
| | |
|---|---|
| *B03C 3/47* | (2006.01) |
| *B03C 3/09* | (2006.01) |
| *B03C 3/49* | (2006.01) |
| *B03C 3/68* | (2006.01) |
| *F01N 3/01* | (2006.01) |

(52) U.S. Cl.
CPC ... *B03C 3/47* (2013.01); *B03C 3/09* (2013.01); *B03C 3/49* (2013.01); *B03C 3/68* (2013.01); *F01N 3/01* (2013.01); *B03C 2201/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,616,606 A * | 11/1971 | Vincent | ............... | B03C 3/09 96/66 |
| 3,740,927 A * | 6/1973 | Vincent | ............... | B03C 3/09 96/54 |
| 3,820,306 A * | 6/1974 | Vincent | ............... | B03C 3/09 96/54 |
| 4,496,375 A * | 1/1985 | Le Vantine | ............... | B03C 3/32 361/230 |
| 5,199,257 A * | 4/1993 | Colletta | ............... | B01D 53/32 60/275 |
| 6,878,192 B2 * | 4/2005 | Pasic | ............... | B03C 3/09 96/66 |
| 7,449,053 B2 * | 11/2008 | Hallam | ............... | A61L 9/015 95/58 |
| 2004/0065594 A1 * | 4/2004 | Parsa | ............... | B01D 53/323 209/400 |

* cited by examiner

*Primary Examiner* — Duane Smith
*Assistant Examiner* — Sonji Turner
(74) *Attorney, Agent, or Firm* — Fox Rothschild LLP (57) ABSTRACT

An electrostatic screen battery for emission control (ESBEC) system includes a plurality of screens arranged in an alternating manner, so that screens at a first electric potential are interposed with screens at a second electric potential, with an ionizer disposed upstream of the screens, wherein a particulate-containing exhaust stream passing by the ionizer and then through the screens deposits particulates onto the screens. In preferred embodiments the screens have hydrophobic surfaces.

3 Claims, 8 Drawing Sheets

| Screen set | Gap inch | Ionizer (12 v) mA | High Voltage kv | Screen dw inch | Porosity | Mesh Size | Collection Efficiency | | | | | | | | | | Sum | After-Filter |
|---|---|---|---|---|---|---|---|---|---|---|---|---|---|---|---|---|---|---|
| | | | | | | | S1 G | S2 C | S3 G | S4 C | S5 G | S6 C | S7 G | S8 C | S9 G | S10 C | | |
| A. Increasing a set of screens | | | | | | | | | | | | | | | | | | |
| 1 | 3/4 | 24 | off | 0.028 | 0.44 | 24 | 1.5% | 1.5% | | | | | | | | | 3% | 97% |
| 1 | 3/4 | 24 | 8 | 0.028 | 0.44 | 24 | 0.3% | 40.9% | | | | | | | | | 41% | 59% |
| 2 | 3/4 | 24 | 8 | 0.028 | 0.44 | 24 | 0.5% | 45.1% | 0.1% | 25.4% | | | | | | | 71% | 29% |
| 3 | 3/4 | 24 | 8 | 0.028 | 0.44 | 24 | 0.1% | 44.5% | 0.2% | 17.8% | 0.1% | 12.5% | | | | | 75% | 25% |
| B. Increasing gap between two screens | | | | | | | | | | | | | | | | | | |
| 3 | 3/4 | 24 | 8 | 0.028 | 0.44 | 24 | 0.1% | 44.5% | 0.2% | 17.8% | 0.1% | 12.5% | | | | | 75% | 25% |
| 3 | 1.5 | 24 | 8 | 0.028 | 0.44 | 24 | 8.1% | 32.0% | 0.4% | 20.1% | 0.2% | 15.6% | | | | | 76% | 24% |
| C. Increasing currents of ionizer | | | | | | | | | | | | | | | | | | |
| 3 | 1.5 | 24 | 8 | 0.028 | 0.44 | 24 | 8.1% | 32.0% | 0.4% | 20.1% | 0.2% | 15.6% | | | | | 76% | 25% |
| 3 | 1.5 | 50 | 8 | 0.028 | 0.44 | 24 | 11.9% | 42.4% | 0.7% | 18.7% | 0.2% | 11.6% | | | | | 86% | 14% |
| D. coarse mesh screen vs. fine mesh screen | | | | | | | | | | | | | | | | | | |
| 3 | 1.5 | 24 | 8 | 0.028 | 0.44 | 24 | 8.1% | 32.0% | 0.4% | 20.1% | 0.2% | 15.6% | | | | | 76% | 25% |
| 3 | 1.5 | 24 | 8 | 0.009 | 0.30 | 100 | 16.5% | 32.6% | 0.1% | 17.8% | 0.1% | 13.0% | | | | | 79% | 21% |
| E. coarse mesh screen vs. fine mesh screen | | | | | | | | | | | | | | | | | | |
| 5 | 3/4 | 50 | 8 | 0.028 | 0.44 | 24 | 5.7% | 46.8% | 0.2% | 15.3% | 0.2% | 11.6% | 0.2% | 6.5% | 0.2% | 6.4% | 95% | 5% |
| 5 | 3/4 | 50 | 8 | 0.009 | 0.30 | 100 | 12.2% | 55.0% | 0.2% | 13.1% | 0.1% | 6.8% | 0.2% | 4.2% | 0.2% | 3.9% | 96% | 4% |

G: Ground Electrode
C: Collecting Electrode

Fig. 4

| Test Condition | | |
|---|---|---|
| Flow Rate | $Q_S$ (L/min) | 20 |
| Aerosolization Flow Rate $Q_A$ (L/min) | | 5.0 |
| Total Flow Rate | $Q_{S+A}$ (L/min) | 25.0 |
| | $Q_{S+A}$ (m³/s) | 0.0004 |
| Face velocity | $V_f$ (m/s) | 0.37 |
| Sampling time | t (min) | 20 |
| Particle Size | $d_p$ (μm) | 0.2 |
| Reynolds number | $Re_d$ | 903 |
| Ionizer codition | voltage, v/current, mA | 12/24 or 50 |
| High Voltage | kv | 8 |

ELECTROSTATIC SCREEN DEVICE AND METHOD FOR EMISSION CONTROL

CROSS-REFERENCE TO RELATED APPLICATIONS

This application claims the benefit of U.S. Provisional Application 61/711,336 filed on Oct. 9, 2012 and is also a continuation-in-part of U.S. application Ser. No. 12/876,570 filed on Sep. 7, 2010, which claims the benefit of U.S. Provisional Application 61/240,079 filed on Sep. 4, 2009, the teachings of all three of which are incorporated herein by reference.

FIELD OF THE INVENTION

The present invention relates generally to emission control systems and methods. More particularly, the present invention discloses an electrostatic emission control system and related device that is capable of removing fine particulates from engine exhaust.

BACKGROUND OF THE INVENTION

Diesel combustion engines are widely used in heavy-duty trucks, stationary engines (e.g., agriculture engines, water pumps, etc.), and for power generation. They have better efficiency compared to gasoline internal combustion engines and offer better mileage in automotive applications. However, diesel engines tend to have higher nitrogen oxides (NOx) and particulate matter (PM) emissions, which are critical pollutants. With the advent of common rail injection systems and many performance-enhancing modifications, modern diesel engines have decreased their emissions, but still emit relatively high concentrations of particulate matter within a wide range of particle sizes. To meet the emission regulations, a number of diesel particulate filters (DPF) have been developed and implemented as viable devices to minimize diesel soot emission.

Most of the particles from diesel exhaust are less than 2.5 µm in diameter with a substantial fraction of particles being less than 100 nm in diameter. The diesel particulate filters are capable of capturing a substantial fraction of the exhaust particles and can be an effective means of reducing both the particulate mass and particulate number of emissions. However, the current DPFs are not very effective for capturing ultrafine (i.e., less than 100 nm) particles, which have been linked with increased morbidity and mortality. In addition, during the continuous operation of the filter, the captured particles continue to accumulate inside the DPF and cause the pressure in the exhaust system (called backpressure) to increase. Increased backpressure reduces fuel economy and reduces engine performance, thus creating the need for a regenerative or cleansing process. In all traditional DPFs, the regeneration is achieved by burning off the collected matter, which requires consumption of fuel and creates secondary aerosol emission, especially in the 10 to 30 nm size range. The particles produced during DPF regeneration are not captured and contribute ultrafine particles to air pollution.

There therefore exists a need for alternative emission control systems and methods that can reduce engine exhaust particulates.

SUMMARY OF THE INVENTION

An embodiment method removes particulates suspended in an exhaust stream. The particulates are electrically charged and then passed through a plurality of meshes. The meshes are arranged so that meshes immediately adjacent to each other have different electric potentials. In preferred embodiments the electric potentials are ground and 0.2-20 kV.

Various embodiments are directed to electrostatic screen battery for emission control (ESBEC) systems and methods. A preferred embodiment ESBEC system is a device for capturing airborne particulate matter emissions from a variety of mobile and stationary sources, such as diesel engines used in automobiles, marine engines, agricultural equipment, power generation equipment, etc., and aids in entrapment and subsequent collection of airborne particulate matter.

An embodiment system includes a fluidic pathway comprising an opening for accepting the exhaust stream and an exit. First screen and second screens are disposed in the fluidic pathway and electrically connected to respective first and second electric potentials. In preferred embodiments a plurality of first screens and a plurality of second screens are employed, the first screens and second screens alternately disposed with respect to each other within the fluidic pathway, and an ionizer (to provide electrical charge to incoming particles) is disposed in the fluidic pathway upstream of the first pair of first and second screens. Various embodiments of ESBEC systems employ metal screens coated with hydrophobic materials and supplied with high voltage. The hydrophobic coating on the screen surfaces enhances the removal of material collected on the meshes, such as by way of a liquid medium, and helps in regeneration of the screens for continued use.

Various embodiment systems may remove above 95% of the engine exhaust particles, including those in nano-sized range. Some embodiments may be used in place of existing Diesel Particulate Filters (DPFs) in automotive diesel engines. Unlike traditional DPFs, the ESBEC device creates minimal resistance to the engine exhaust; this virtually zero pressure drop ensures smooth operations when employed downstream of systems that are maintaining a low backpressure to avoid increased fuel consumption, which may thus boost engine power and, in the case of mobile engines, improve mileage.

Preferred embodiment systems and methods eliminate the secondary aerosol emissions. (especially in the 10-30 nm range) produced during thermal regeneration (burning off collected mater) of current DPF devices, thus further reducing air pollution.

Further, preferred embodiment systems provide an economical alternative to ceramics-based particulate filters, and the unique liquid based recovery and regeneration system of the some embodiments can provide residual material such as carbon black that can be utilized in other industrial applications. Hence, beyond being cost effective, preferred embodiments may provide added economic advantage by generating secondary raw materials.

DETAILED DESCRIPTION

Various embodiment engine exhaust control devices provide high particle collection efficiencies, including those in the nanometer size range, without adding to the exhaust backpressure and without the need for thermal regeneration of collected particles. These embodiments may employ the following emission control method: airborne particles are electrically charged, such as by way of an ionizer like a corona charger, and then are passed through an alternating succession of differently charged screens, preferably grounded screens and charged screens. That is, in preferred embodiments a grounded screen is followed by a charged screen, which is followed by another grounded screen, and so forth. These screens preferably have hydrophobic surfaces. This alternating succession of differently charged screens, which may be viewed as a battery of screens, is termed herein as an electrostatic screen battery for emission control (ESBEC) device. Other possible electrical arrangements include a charged screen followed by a grounded screen. The polarity of the charged screen is preferably opposite the polarity of the electrical charge imparted by the ionizer. Specific voltage values may be varied depending on the desired collection efficiency and safety concerns.

In some embodiment systems, several ESBEC batteries may operate in parallel to split the exhaust flow thus reducing its velocity and improve particle capture efficiencies. Yet another embodiments comprise a "carrousel" of ESBEC batteries, in which while one is operating, one or more are undergoing regenerative processes and removal of collected particles via liquid or other means.

Figure 1:
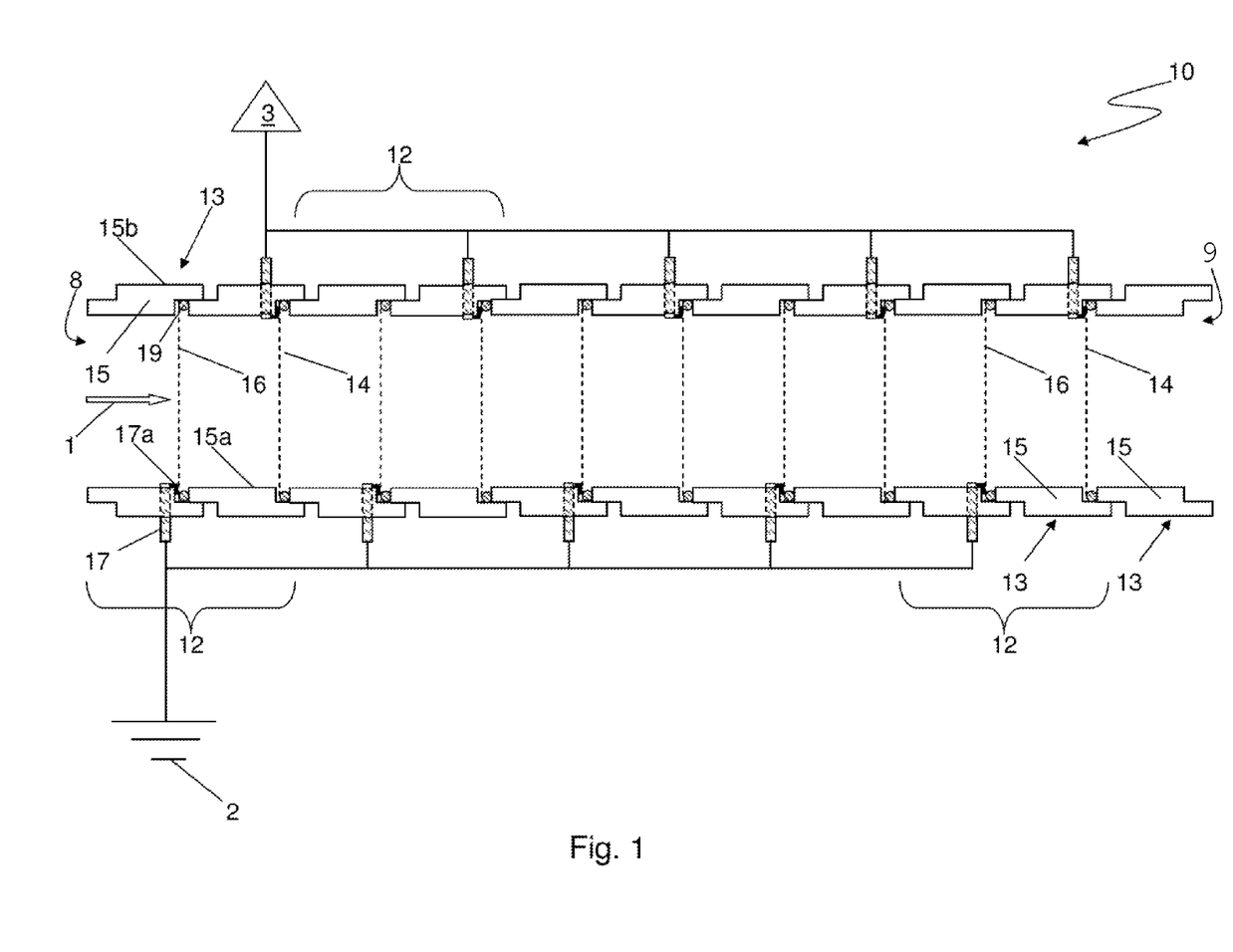
FIG. 1 is schematic view of an embodiment electrostatic screen battery for emission control (ESBEC).

Any suitable arrangement may be employed to provide a battery of screens, and one specific arrangement is described in the following. It will be appreciated, however, that many other mechanical and electrical configurations are possible to provide such screen batteries. With reference to FIG. 1, an embodiment ESBEC device 10 comprises a plurality of screen sets 12, each screen set 12 having a charged screen 14 following a grounded screen 16, or vice versa. The sets 12 are serially coupled together to provide an ESBEC device 10 of the desired length, number of screens 14, 16, or both. The screens 14, 16 provide a mesh through which an exhaust stream may easily flow. Larger mesh sizes may present less exhaust backpressure at the expense of particle collection efficiencies, whereas the reverse may be true of smaller mesh sizes. Although pressure drop may depend on the mesh size (e.g., 24×24 versus 100×100), this pressure drop is still on the order of about $10^{-3}$ in $H_2O$, and thus is minimal. The mesh sizes of the screens 14, 16 can vary and are preferably from 10×10 to 24×24 openings per inch. For example, 24×24 per inch mesh with wire 0.028 inches thick may be beneficially employed that is, 24 openings vertically per inch by 24 openings horizontally per inch, using wire 0.028 inches in thickness). Such mesh size ranges are readily commercially available for woven wire screens; for example, medium mesh (17×17 up to (60×60 mesh) and coarse mesh (2×2 mesh up to 16×16 mesh). The wire diameter varies depending on the mesh density and porosity (fraction of open space). Example suppliers of suitable mesh include InterNet Inc., Anoka, Minn.

For the embodiment ESBEC device 10, each of the sets 12 is formed by two screen units 13, which are coupled together to form the respective set 12. An O-ring 19, or any other suitable sealing device may be disposed between the screen units 13, and by extension between the sets 12, to provide a fluidically tight seal between each of the serially connected screen units 13 in the ESBEC device 10. Each of the units 13 comprises a body 15, which is hollow in shape, such as an annular shape, so that when serially connected to each other an enclosed fluidic pathway 1 is formed, which has an opening 8 for accepting an exhaust stream with suspended particulates and an exit 9 for exhausting a filtered stream. Hence, each body 15 defines an interior surface 15a and an exterior surface 15b. The body 15 may be made from any suitable material, preferably non-conductive and heat resistant materials such as ceramics. An electrical conductor 17 passes through the body 15 from the exterior surface 15b to the interior surface 15a to establish an electrical connection with the corresponding screen 14, 16. In some embodiments an auxiliary conductor 17a, such as solder, a wire, or a combination thereof, may be employed to electrically connect the conductor 17 to its respective screen 14, 16.

For each unit 13, the corresponding screen 14, 16 is preferably arranged perpendicularly to the fluidic pathway 1, and subtends across the entire cross-section of the fluidic pathway 1. The exterior boundaries of the screens 14, 16 are thus preferably in contact with, of bonded with, the interior surface 15a of the screen unit 13. The screens 14, 16 are preferably made from any suitable electrically conductive material, such as copper, stainless steel, brass or others with suitable properties. Additionally, the surfaces of the screens 14, 16 are preferably hydrophobic. This may be an intrinsic property of the material from which the screen 14, 16 is made, or may be provided by, for example, a suitable coating applied to the external surfaces of the screen 14, 16. Preferred coatings are materials with superhydrophobic properties (high water contact angle) while being thermally stable, durable, with high adhesion strength and resistance to temperature changes; by way of example, HIREC-1450 of NTT Corporation Inc., Tokyo, Japan, may be employed. All or a portion of the surface of the screen 14, 16 may be hydrophobic. In preferred embodiments at least 80% of the entire surface of the screen 14, 16 is hydrophobic. In more preferred embodiments at least 90% of the entire surface of the screen 14, 16 is hydrophobic. In the most preferred embodiments the entire surface of the screen 14, 16 is hydrophobic.

The electrical conductors 17 in each set 12 are respectively used to couple one of the screens 14 to a high-voltage DC power source 3 and the other of the screens 16 to ground 2. The high-voltage DC power source 3 may be any suitable power supply, such as stationary power supply 205B-10R made by Bertan Associates Inc., Valhalla, N.Y. For mobile and compact applications, such as for engines, any suitable compact DC-to-DC converter may be used. The high-voltage DC power source 3 preferably provides a voltage from 0.2 kV to 20 kV to the charged screens 14, although other voltage may be used as long as it provides an electrostatic. field of sufficient strength to deposit particles on the mesh. Voltages between 4 and 18 kV are typically used, with voltages between 8 and 16 kV being more typical. An electrical field is thus produced across the screens 14, 16 in each set 12, and by extension between each set 12 in the ESBEC device 10.

As charged particles pass through the ESBEC device 10, they are removed by attachment to the screens 14, 16 via the electrostatic field. Use of multiple screen sets 12 ensures high collection efficiencies. The strength of electrostatic field between the screens 14, 16 is directly proportional to the voltage and inversely proportional to the distance between the screens 14, 16. Thus, the voltage can be varied depending on the particular embodiment of the ESBEC. The voltage is preferably not so high that it produces corona discharge on the screens 14, 16. Upper voltage range is limited by dielectric breakdown of air, i.e. when voltage is too high, it will cause sparking between screens thereby reducing effectiveness of the system. The number of screens may be varied depending on the operating conditions, such as exhaust flow rate and exhaust particle concentration.

Figure 2:
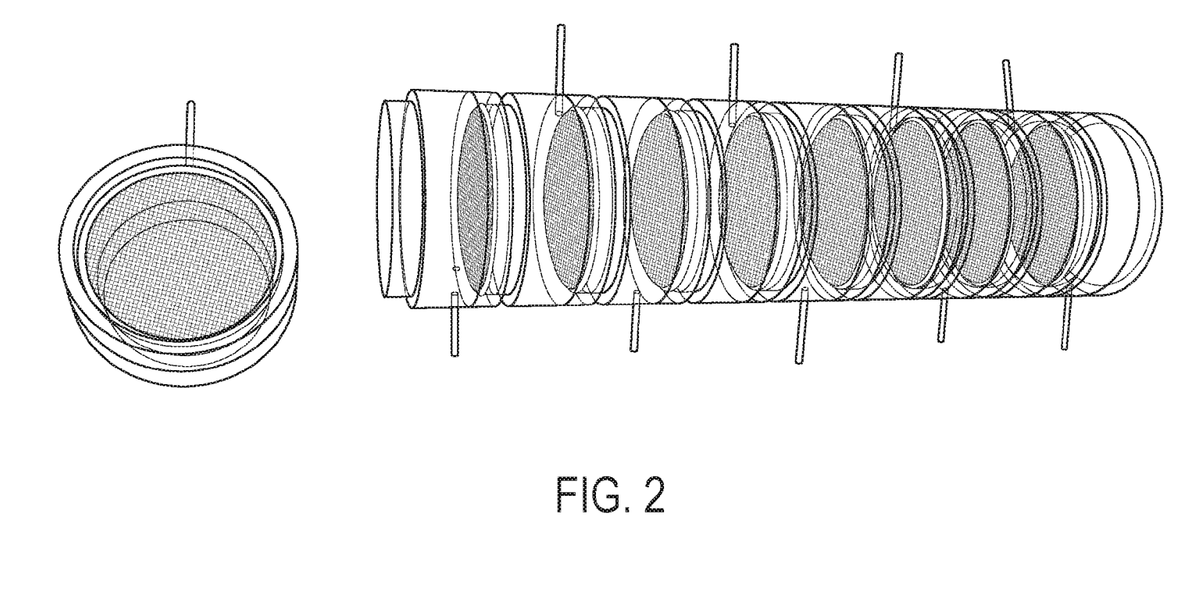
FIG. 2 is a photograph of the embodiment ESBEC depicted in FIG. 1.

By way of example, testing indicated high collection efficiencies with five sets (10 screens), for which the length of the battery was about 10 inches. Preliminary testing indicates that in certain embodiments 99% of 200 nm polystyrene latex particles may be removed, which included embodiments having ten 24×24 mesh sized screens tested at 8 kV, and ten 100×100 mesh sized screens tested at 8 kV. The removal efficiency can be further improved by adjusting charging conditions and by increasing the number of screen sets 12. The adjustment of charging conditions may also be employed to adjust collection efficiencies. For example, increased amounts of electrical charge may be achieved by having multiple ionizers/chargers 54 (shown in FIG. 3) or having just one with a higher ion output capacity. A higher electrical charge imparted to the exhaust particles may reduce the voltage magnitude from the source 3 needed to achieve high collection efficiencies. Moreover, the flow resistance through the ESBEC device 10 is minimal. The pressure drop is estimated to be much less than a 1 cm water gauge. A photograph of an embodiment ESBEC device is shown in FIG. 2, with one of the screen units separated from the device for ease of viewing.

Figure 3:
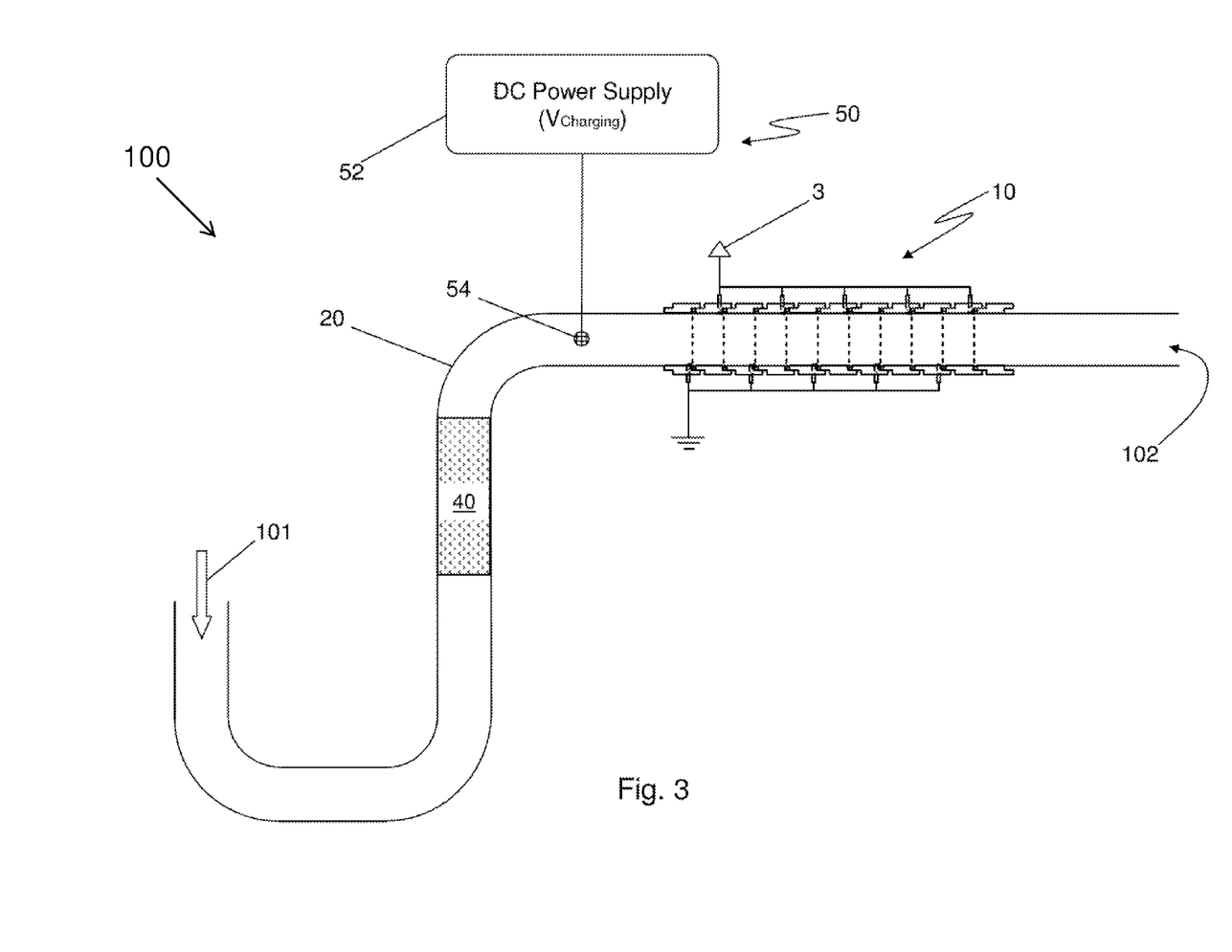
FIG. 3. illustrates an engine exhaust system employing the ESBEC shown in FIG. 1.

A system 100 employing the ESBEC device 10 is shown in FIG. 3. The system 100 includes an engine exhaust path 20 through which an exhaust gas stream 101 flows. A charge neutralizer 40 may be disposed in the exhaust path 20 in some embodiments to reduce exhaust particle charge to Boltzmann equilibrium to ensure their more uniform charging by charger 54.

A charging system 50 is set up within the system 100 upstream of ESBEC and downstream from the charge neutralizer 40 of present). The charging system 50 comprises a DC power supply 52 electrically connected to an ionizer 54 that is disposed within the exhaust path 20 downstream from the charge neutralizer 40. The electrically neutralized particles pass through, for example, a vertically oriented ionizer 54 (such as an AS 150, Wein Products Inc., Los Angeles, Calif.) which imparts positive charge on the particles under controlled voltage (such as 12V) and current settings (such as 50 mA). The DC power supply 52 (such as a BK Precision, Yorba Linda, Calif.) provides power to the ionizer 54. Any other ion source or multiple sources may be used to achieve the desired electrical charging of the exhaust particles, and it will be appreciated that other ionizers may employ different voltage and current drive values based upon their respective designs. The charger 54 maybe located separately upstream of collector 10 or may be integrated with collector 10 to form one unit.

In one embodiment where the charger is integrated with the collector (FIG. 7), the ionizer is a carbon fiber brush 60 that is disposed within the exhaust path 20 in front of the collector 10. Alternatives to the carbon fiber brush 60 include carbon band, multiple carbon strands forming a web (like a screen) across the collector (cylinder), tungsten wire, and tungsten wire web. In a particular embodiment in FIG. 7, an electrically grounded screen 62 is positioned between the carbon fiber brush 60 and the first screen 14, 16 in the series of screens 14, 16. The carbon fiber brush 60 is situated perpendicular to the direction of air flow. The carbon fiber blush 60 can contain any suitable number of carbon fibers.

Figure 7:
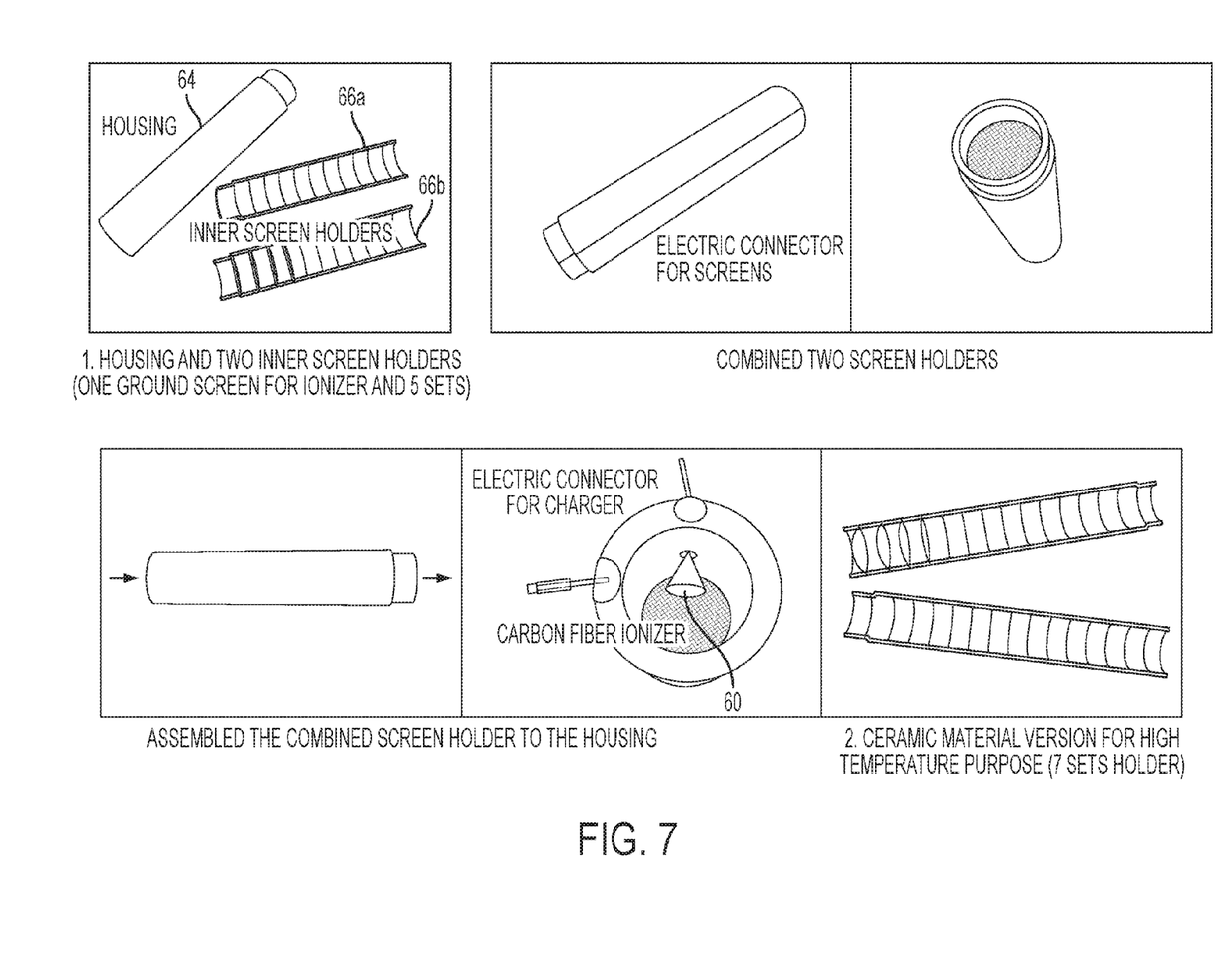
FIG. 7 is a series of photographs of the ESBEC embodiment depicted in FIG. 6.

In one embodiment, the carbon fiber brush 60 contains about 400 carbon fibers. The carbon fiber brush 60 is connected to high voltage of the sign opposite to the high voltage connected to the battery of screens. High voltage between the electrically grounded screen 62 and the tips of the carbon fibers creates a strong electrical field which causes the emission of ions from the carbon fiber brush 60. These ions attach to the incoming airborne particles. As the charged particles move further into the battery, the screens 14, 16 connected to the voltage opposite to the sign of charge on particles attract the particles and remove them from the air stream onto meshes.

Figure 6:
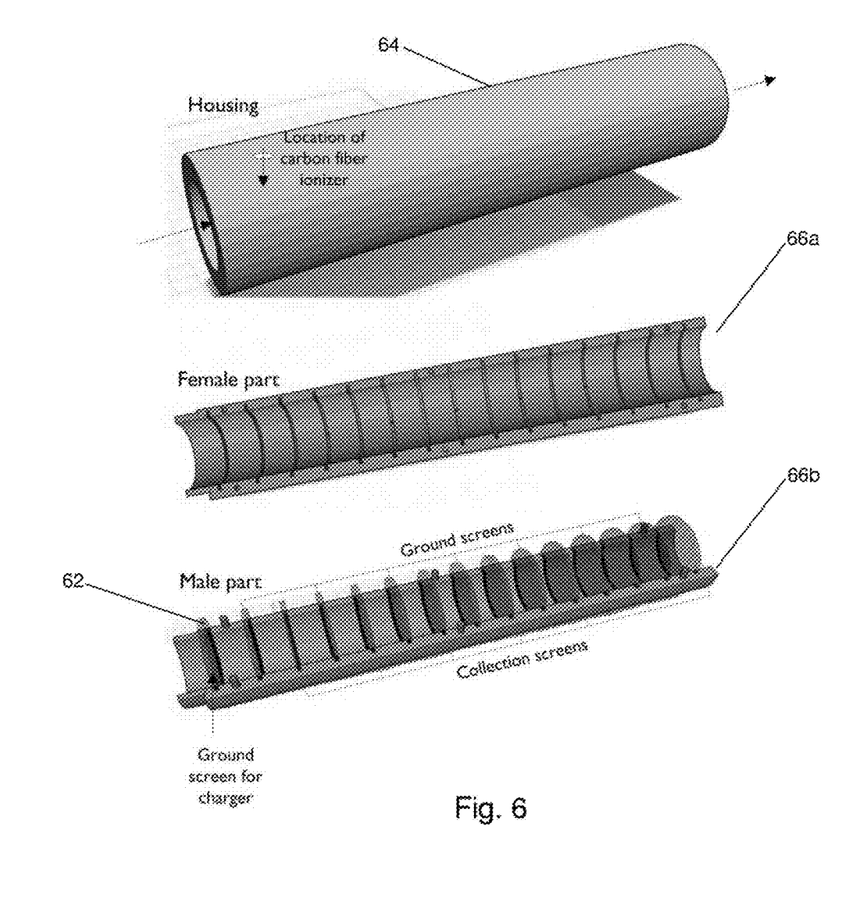
FIG. 6 is a schematic view of one embodiment of an ESBEC.

FIGS. 6 and 7 illustrate several components of a particular embodiment that includes the carbon fiber brush 60. In this embodiment the collector can be made from any suitable material, including, but not limited to, plastic or ceramic. The collector includes two half-cylinder shells. 66a and 66b to hold the electrically grounded screen 62 and screens 14, 16. The carbon fiber brush 60 is positioned in an outer shell 64 which is slid over the collector to form an air-tight unit. The performance of the device can be modified by adjusting any of the following: length of the collector (cylinder), number of screen sets, number and position of carbon brushes, number of fibers in each brush, particular configuration of carbon brushes or strands, strength of the electrical field for the charger, strength of the electrical field for the collector, and air velocity and/or flow rate through the collector. Tungsten wire or tungsten wire webs can also be used for charging.

Figure 8:
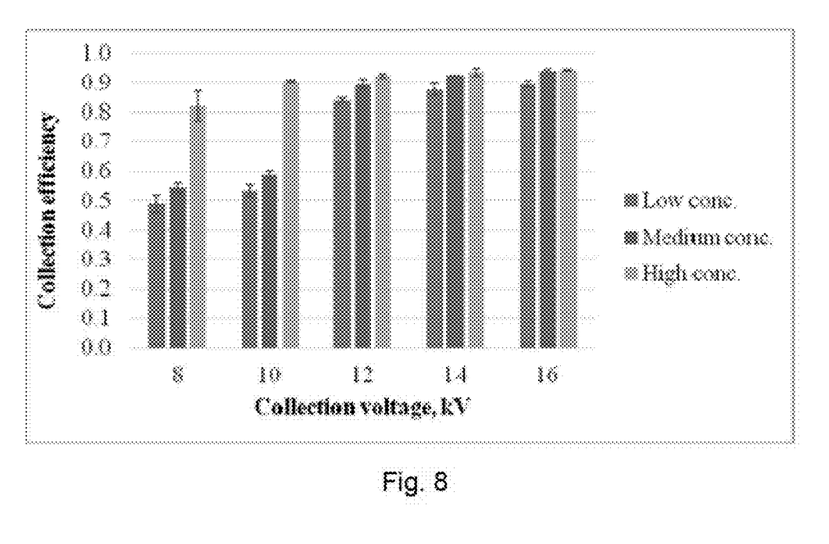
FIG. 8 shows collection efficiency of the ESBEC depicted in FIGS. 6 and 7 at different collection voltages.

Performance of a particular embodiment presented in FIG. 7, when challenged with diesel exhaust of three different concentrations and at different collection voltages (−8 to −16 kV) is presented in FIG. 8. The charging voltage was fixed at +10 kV. The diesel exhaust concentration ranges were determined by an aerosol photometer pDR-1200 (Thermo Fisher, Franklin, Mass.): low: <10 mg/m$^3$, medium: 80-140 mg/m$^3$ and high: 320-400 mg/m$^3$. As illustrated by the figure, collection efficiency above 80% was achieved for collection voltages >12 kV at short-term sampling tests (5 min). Collection efficiency reached 90% when collection voltage of −16 kV was used. A diesel electrical generator (6000 watt diesel generator, Central Maine Diesel Inc.) was used as a source of diesel exhaust. This result was confirmed when collecting diesel exhaust on filter with ESBEC power ON and OFF.

An embodiment ESBEC device, such as the device 10 illustrated in FIG. 1, is then fluidically coupled to the exhaust path 20 downstream from the charging system 50. In other embodiments. ESBEC device is coupled with charging system. As indicated earlier, the charge imparted by the charging system 50 is preferably of a polarity that is opposite that used for the screen battery 10. The air carrying particulate matter within the exhaust stream 101 which is electrostatically charged by the charging unit 50, then successively passes through the alternating arrangement of screens at different electric potentials. Hence, with respect to the specific device 10, the exhaust stream 101 passes through successive pairs of electrically neutral (grounded) screens 16 and charged screens 14 before exiting the system 100 at exhaust port 102. The particulate matter suspended in the exhaust stream 101 is deposited onto the screens 14, 16, thereby cleaning the stream 101.

Figure 4:
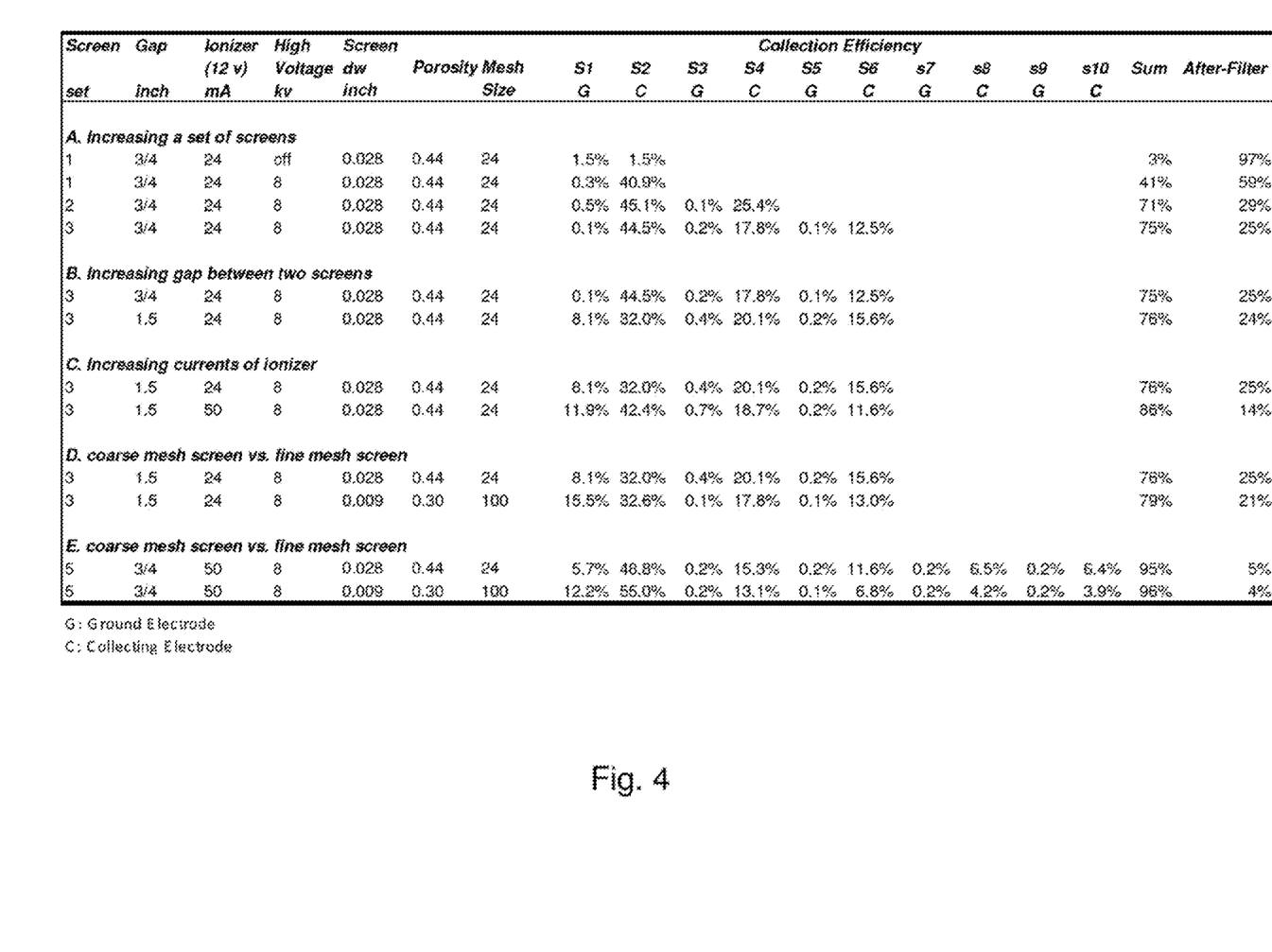
FIG. 4 is a table showing test data of the embodiment ESBEC shown in FIG. 1 using 0.2 µm polystyrene latex particles.
Figure 5:
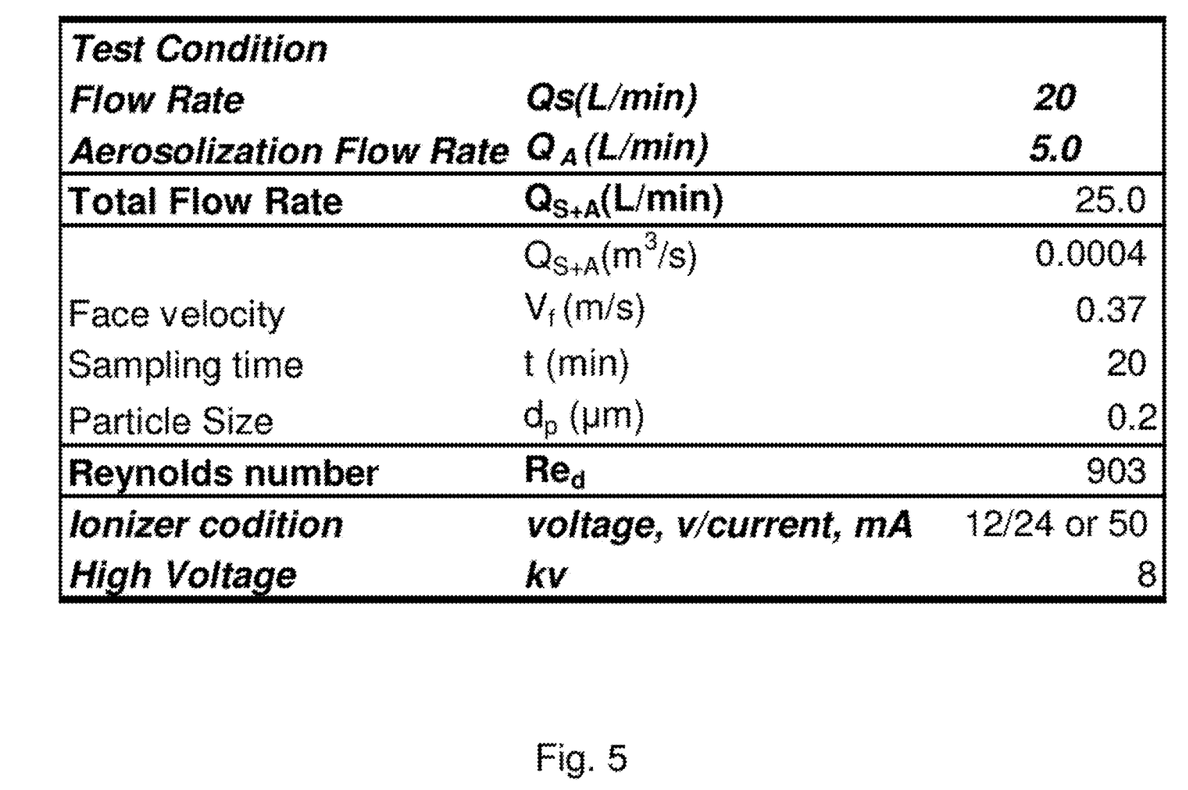
FIG. 5 is a table showing bench scale test conditions for an embodiment ESBEC shown FIG. 1.

FIG. 4 is a table showing test data collected from an embodiment ESBEC device (FIGS. 1 and 2) with 0.2 μm polystyrene latex particles. FIG. 5 is a table indicating bench scale test conditions for the tests performed in relation to the data of FIG. 4. As shown in FIG. 4, particulate collection abilities improve with the number of screens, the amount of current of the ionizer and, to somewhat of a lesser extent, the screen mesh size.

Once the exhaust particles, such as diesel exhaust particles, accumulate they can be washed off of the screens 14, 16 using a liquid, such as water or other liquids capable of removing collected particles. The hydrophobic nature the surface of the screens 14, 16 may allow easy cleaning without the need for thermal regeneration and the attendant release of nano-sized particles. Cleaning can be achieved using spray nozzles or submerging the ESBEC device in a wash vessel. This can involve rotating one, more or all of the battery sets 12, for example, when one battery 12 is being washed-off, an alternative one 12 is used, or it can involve periodic replacement of the one, more or all of the battery sets 12. In addition, non-thermal regeneration avoids the use of additional fuel to provide the heat for burn-off as is done in thermal regeneration. Moreover, non-thermal regeneration avoids production of additional particles attendant to the burn-off process. These advantages boost engine power and, for mobile systems, improve mileage. In one embodiment, when the ESBEC device is used with stationary engines, the carbon soot may be extracted from the screens and used as a raw material in allied industries such as tire manufacturing.

In summary, the devices and methods employed by various embodiments of the present invention possess the following advantages over existing technologies: 1) Unlike traditional DPFs, high porosity of the ESBEC device screens does not create any resistance to the engine. exhaust. This boosts engine power and improves mileage. 2) Since no thermal regeneration is involved, the ESBEC device eliminates secondary aerosol emissions, especially in the 10-30 nm range, which are produced during thermal regeneration (burning off collected matter) of current DPFs and that contribute to air pollution. 3) The carbon soot captured on the ESBEC device screens can be extracted via washing and used as a raw material in allied industries like. tire manufacturing. Finally, 4) use of screen-based devices creates virtually no pressure drop and does not reduce engine power during operation.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A system for removing particulates suspended in an exhaust stream, the system comprising:
    a fluidic pathway comprising an opening for accepting the exhaust stream and an exit;
    at least one first screen disposed in the fluidic pathway;
    at least one second screen disposed in the fluidic pathway adjacent to a first screen;
    an ionizer disposed in the fluidic pathway upstream of the first and second screens;
    a charge neutralizer disposed in the fluidic pathway upstream of the ionizer;
    a first conductor electrically coupled to each first screen for electrically connecting each first screen to a first electric potential; and
    a second conductor electrically coupled to each second screen for electrically connecting each second screen to a second electric potential that is different from the first electric potential;
    wherein at least one first screen or at least one second screen has a hydrophobic surface.

2. The system of claim 1 further comprising a plurality of first screens, a plurality of second screens, the first screens and second screens alternately disposed with respect to each other within the fluidic pathway, the first screens electrically connected to the first conductor, the second screens electrically connected to the second conductor.

3. The system of claim 1 further comprising a direct current (DC) power source electrically connected to said second conductor to electrically bias the second screens at a predetermined voltage.

* * * * *